Patented June 18, 1929.

1,718,011

UNITED STATES PATENT OFFICE.

CLARENCE C. VOGT, OF HADDONFIELD, NEW JERSEY, ASSIGNOR TO ARMSTRONG CORK COMPANY, OF PITTSBURGH, PENNSYLVANIA, A CORPORATION OF PENNSYLVANIA.

ARTIFICIAL BOARD AND ITS MANUFACTURE.

No Drawing.   Application filed September 29, 1927. Serial No. 222,937.

The present invention relates to artificial board and its manufacture and more especially to an insulating board made of matted cellulose plant fibres having air spaces so as to serve as an efficient heat insulator. The board is made from the fibres of plants which contain a natural binding material which may be converted into a water-proof binder by suitable reagents, as hereinafter described. Plant materials of this character are cooked with water to partially dissolve the natural binder of the plant fibres and the material is mechanically disintegated so as to produce a fibrous mass which is saturated with the water solution containing the natural binder. This mass is treated with a suitable reagent, such for example, as a phenolic compound, which will convert the water soluble natural binder into a water insoluble binder, and the mass is formed into board form and so treated, as by baking, for example, as to set the binder and form the completed board product. Instead of dissolving and washing out the natural binding material of the plant fibres, and supplying another binder for making the board, I allow this binding material to remain with fibres to serve as the basis of the water-proof binder of the completed board. The binder thus formed serves to firmly unite the fibres into a stiff structurally strong board but with a considerable number of minute spaces between the fibres in which air is entrapped and held so that the board is particularly useful as a heat insulating building material.

I have found that most plant materials other than the wood of the usual trees are satisfactory as a basis. For example, corn stalks, corn cobs, straw, sugar cane bagasse, oat hulls, peanut shells, cat tails, salt hay, peat moss and the like may be used. These materials and particularly materials, such as corn stalks and straw, contain a natural binder which may be partially dissolved or decomposed by cooking with water, either hot water or steam, and which can serve as the basis for the water-proof binder of the completed board. I have found that material such as wood pulp made from ordinary pulp making trees does not contain such binder or sufficient quantity of the binder to be satisfactorily used alone, altho the wood pulp may be used in combination with the pulp formed from materials, such as corn stalks, which are relatively rich in such binder. The binding material apparently consists of pentosans (substances from which the five carbon atoms sugars may be formed by hydrolysis or other chemical means) and other organic compounds forming the binder which cements together the plant fibres. This binder, after the cooking treatment with water, may be converted into a water insoluble or difficultly soluble binder by a treatment with a suitable chemical reagent, such, for example, as a phenol, which forms upon suitable treatment, such as heating, a resin-like condensation product.

The preferred procedure in carrying out my process is as follows. Any part of the plant may be used so long as it contains the fibrous cellulose material and the natural binder. For example, the corn stalks, including the leaves, as harvested from the corn-fields, may be used. The material is first preferably cut up into convenient size for handling and is cooked with water, in the form of either hot water or steam (water vapor). Therefore, when I speak of cooking or treating with water, I intend to include water either in the liquid state or in the vapor state (steam). This cooking treatment is preferably carried out in an autoclave under pressure at a temperature between 140° and 180° centigrade for a half an hour to an hour, either using water which is heated in the autoclave, or admitting steam under pressure into the autoclave.

The water in the form of hot water or steam at these temperatures dissolves or partially dissolves and decomposes the pentosans and other organic compounds which serve as the natural binder of the cellulose fibres in the plant. This treatment does not decompose or weaken the cellulose fibres, as is the case where chemicals are used to remove the binder which is the usual commercial practice in preparing fibres for making boards of this type. This cooking treatment softens the material so that the fibres are readily separated by any suitable mechanical means, as for example, by rolling or beating in a beater, grinding in a rod mill, treating in a Jordan engine or the like. Such treatment reduces the material into a fibrous mass, which is saturated with the water solution containing the natural plant binder. Contrary to the usual commercial practice in making fibre board, the fibres are not washed, but the solution is allowed to remain with them so that the fibres are kept in contact and are saturated with the solution containing the natural plant binder. The natural binding material, which apparently consists of pentosans and the like, may be either dissolved in water without chemical change or may be partially decomposed by the cooking operation. The actual chemical formulæ and constitution of the substances as they exist in the water solution are not known since they apparently consist of many complex compounds.

These materials have adhesive qualities, as is demonstrated by separating the water solution and boiling it down to a syrup-like consistency. The binding material however is readily soluble in water and would not in its form as produced by the cooking operation be satisfactory where a waterproof binder is desired, as in an insulating board.

The fibrous mass saturated with the water solution containing the natural binding material of the plant, is treated with a suitable reagent to render the binding material water insoluble. For this purpose I prefer to use a phenolic compound containing the characteristic phenolic OH group, together with a suitable condensing agent such as hydrochloric acid, ammonium chloride or the like, which will react with the natural binding material to form an insoluble resinous condensation product when subjected to heat.

These reagents are preferably added to the mass before it is formed into board form, but I do not intend to limit my claims to any particular sequence of such steps unless so specifically stated. In the preferred process, the phenolic body and the condensing agent are thoroughly mixed with the fibrous mass or pulp, which is then made into board form by the usual insulating board making machinery. This operation mats the fibres together to form the fibre board. The excess solution may be drained off from the pulp during the board making operation, altho I prefer to allow as much as possible of the solution containing the natural binder to remain in the board.

The board thus formed is baked to drive off the water and convert the natural binder into a water insoluble binder. Under the action of heat and the condensing agent, the natural binder combines with the phenolic compound used to form a resin-like water insoluble condensation product, which serves to bind together the fibres into a water repellent structurally strong but porous board. The baking may be carried out in ovens or other suitable devices, but care should be taken not to overheat the material during baking so as to weaken or char the fibres or the binder. It has been found safe to heat up to about 160° centigrade, altho a somewhat lower temperature at a longer time is preferable.

If a fire retardant board is desired, it may be rendered resistant to fire by treatment with ammonium sulphate or ammonium phosphate or other well known fire preventing agents. This treatment does not interfere with the process of manufacture as herein outlined. Also if a tougher and less stiff board is desired, the binding material may be modified by the addition to the mass with the phenolic body and condensing agent, of some tough insoluble pitch-like substance, such as stearin pitch, petroleum pitch, wax tailings, asphalt, coal tar, wood tar, or similar materials which do not interfere with the formation of the condensation products but which toughen them, as described, for example, in the variation of my process, which is made the subject matter of another application filed by me and Ernest J. Pieper, of even date herewith, Serial No. 222,938.

Some of the plant materials, such as corn stalks, contain sufficient natural binder so that other fibrous materials, such as wood pulp, paper pulp, which do not contain the natural binder or materials such as sugar cane residue, peanut hulls, corn cobs and the like, which may contain a natural binder but which have not been cooked to render such binder available, or even inorganic materials such as mineral wool, asbestos or the like, may be added as filler. When such filling material is added, it is mixed with the pulp-like mass of plant fibres and saturating solution, so that the filler material also becomes saturated with the natural binder in the solution, and upon condensation of the binder the whole mass will be bound together.

As will be apparent from the foregoing description, I utilize the natural binding material of the plant. The fibres are impregnated with their own natural binding material and all that is required is to treat the fibres already so impregnated, with a reagent which will render this binding material water insoluble.

While I have specifically described the preferred embodiment of my invention, it is to be understood that the invention is not limited to the described details or sequence of steps, but may be otherwise embodied and practiced within the scope of the following claims.

I claim:

1. The process of making board from plants of the character described, which comprises cooking the plant material and mechanically separating the fibres so as to produce a fibrous mass saturated with a water solution containing the natural binder of the plant fibres, adding to the mass a phenolic body and forming it into board form, and baking the board to form a water repellent phenolic condensation product binder from the natural binder.

2. The process of making board from plants of the character described, which comprises cooking the plant material and mechanically separating the fibres so as to produce a fibrous mass saturated with a water solution containing the natural binder of the plant fibres, adding to the mass a phenolic body and a condensing agent and forming it into board form, and baking the board to form a water insoluble phenolic condensation product binder from the water soluble natural binder.

3. The process of making board from plants of the character described, which comprises cooking the plant material and mechanically separating the fibres so as to produce a fibrous mass saturated with a water solution containing the natural plant fibre binder, and treating the mass so formed with a reagent which converts the natural plant binder into a water repellent binder.

4. The process of making board from plants of the character described, which comprises treating the material so as to at least partially dissolve the natural binder of the plant fibres, mechanically separating the fibres so as to produce a fibrous mass saturated with a water solution containing the natural binder, forming a mass into board form and treating it with a reagent which converts the water soluble binder into a water insoluble binder.

5. The process of making board from plants of the character described, which comprises treating the plant material with water so as to soften the material and produce a water solution containing natural binding material of the plant and mechanically separating the fibres, adding to the mass so produced and saturated with such water solution, a reagent which will combine with the natural plant binder under heat to form a water insoluble binder and forming it into board form, and baking the board to convert the water soluble natural binder into a water insoluble binder.

6. The process of making board from plants of the character described, which comprises forming from the plant material a disintegrated fibrous pulpy mass saturated with a water solution containing the natural binder of the plant, and treating it with a reagent that converts the natural binder of the plant into a water repellent binder for the board.

7. An artificial board containing matted cellulose fibres cemented together by a phenolic condensation product of the natural binder of the plant material employed.

In testimony whereof I have hereunto set my hand.

CLARENCE C. VOGT.